UNITED STATES PATENT OFFICE.

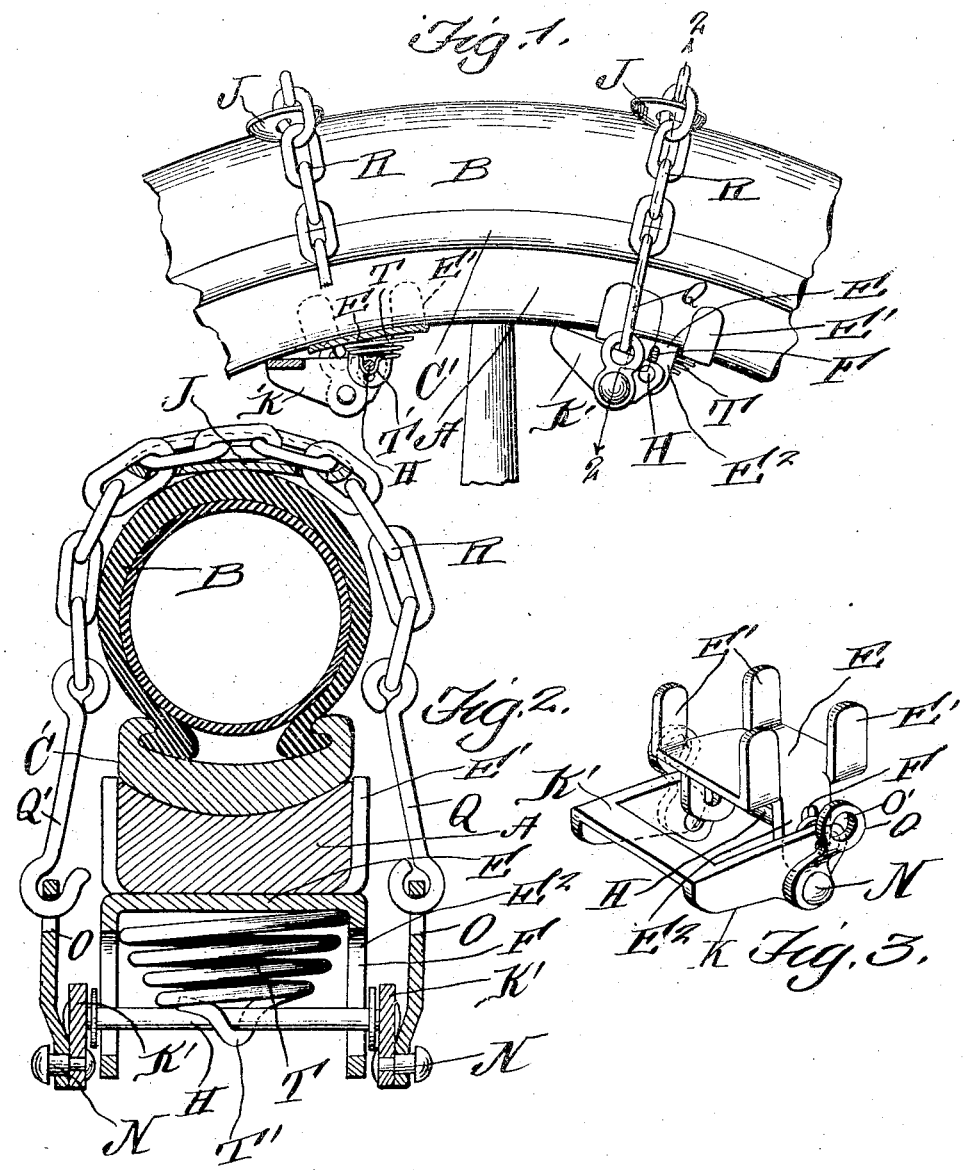

HENRY J. STEIGERWALD, OF AUBURN, NEW YORK.

ANTISKIDDING DEVICE FOR VEHICLE-WHEELS.

1,102,103.  Specification of Letters Patent. Patented June 30, 1914.

Application filed January 20, 1914. Serial No. 813,253.

*To all whom it may concern:*

Be it known that I, HENRY J. STEIGERWALD, a citizen of the United States, residing at Auburn, in the county of Cayuga and State of New York, have invented certain new and useful Improvements in Antiskidding Devices for Vehicle-Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in anti-skidding devices for use in connection with automobile tires and other vehicle wheels and the object in view is to produce a simple and efficient device of this nature which may be easily and quickly clamped about the tire and rim when desired for immediate use.

My invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation showing the application of my device to the tire and rim of a wheel. Fig. 2 is a cross sectional view on line 2—2 of Fig. 1, and Fig. 3 is a detail perspective view.

Reference now being had to the details of the drawings by letter, A designates the rim of a wheel, and B designates a pneumatic tire held to the clencher member C upon the rim. A plate, designated by letter E, is provided with lugs E' which are adapted to engage the opposite sides of the rim, as shown in the drawings, and other lugs, designated by letter E² and bent in the opposite direction, are provided with slots F in which the rod H is adapted to have a movement. Said rod is mounted in the flanges K of the lever K', and headed pins, designated by letter N, are fastened to said flanges and pass through apertures in the links O, which latter are apertured as at O' for the reception of the link Q and hook Q' which are secured one to each end of the chain R. A plate J having apertures therein for the reception of the links of the chain is adapted to be held by the latter against the tread surface of the tire when the device is adjusted for use upon a wheel. A coiled spring, designated by letter T, has one end T' caught over the rod H and said spring bears against the surface of the plate E.

In applying the device to the rim of a wheel, a plate E is placed against the inner marginal edge of the rim and the chain connected to the links in the manner shown, after which the lever is swung to the position shown in Fig. 1 of the drawings and, as the lever swings it is fulcrumed upon the rod H, which latter bears yieldingly against the spring T, while the link pivotally connected to the rivet N swings with the lever and, after the pivotal points between the lever and said rivets pass by the rod H, the spring will buckle and draw the lever against the inner marginal edge of the rim of the wheel. By this movement, which gives a toggle joint action to the chain, the latter will be drawn taut and the plate J, through which the chain passes, will be held frictionally against the tread surface of the tire. A reverse swinging movement of the lever will slacken the chain and allow the same to be readily removed. By having the rivets upon which excessive strain comes, shouldered as shown, the connection will be rendered of sufficient strength to withstand the strain.

What I claim to be new is:—

1. An anti-skidding device for vehicle wheels comprising a plate designed to engage the inner periphery of the rim of the wheel and having slotted lugs projecting therefrom, a lever with a rod fastened thereto and mounted in said slots, a spring interposed between said rod and plate, a chain designed to be passed about the tread surface of the tire, links pivotally mounted upon said lever and to which the ends of the chain are adapted to be fastened, as set forth.

2. An anti-skidding device for vehicle wheels comprising a plate having lugs projecting therefrom and designed to engage over the edges of the inner periphery of the rim, slotted lugs struck up from said plate and projecting in the opposite direction, a rod movable within said slots, a spring interposed between the rod and plate, a lever in which said rod is mounted, a chain adapted to be passed about the tire of the wheel, and links pivoted to said lever and to which the ends of the chain are connected, as set forth.

3. An anti-skidding device for vehicle wheels comprising a plate having lugs projecting therefrom and designed to engage over the edges of the inner periphery of the rim, slotted lugs struck up from said plate and projecting in the opposite direction, a rod movable within said slots, a spring interposed between the rod and plate, a lever in which said rod is mounted, headed rivets fastened to said lever, links pivotally connected to said rivets and having apertures therein, a chain, the ends of which are adapted to be fastened in said apertures, as set forth.

4. An anti-skidding device for vehicle wheels comprising a plate having lugs projecting therefrom and designed to engage over the edges of the inner periphery of the rim, slotted lugs struck up from said plate and projecting in the opposite direction, a rod movable within said slots, a spring interposed between the rod and plate, a lever having two arms, the ends of which are fastened to the ends of said rod, headed rivets fastened one to each of said arms, a crosspiece connecting said arms, links pivotally mounted upon said headed rivets, and a chain, the ends of which are adapted to be fastened one to each of said apertured links, as set forth.

In testimony whereof I hereunto affix my signature in presence of two witnesses.

HENRY J. STEIGERWALD.

Witnesses:
ROBT. L. BENNETT,
JAMES DILLON.